United States Patent
Nye

(10) Patent No.: US 9,468,161 B2
(45) Date of Patent: Oct. 18, 2016

(54) FIXED SPRAY APPLICATION SYSTEM

(71) Applicant: John R. Nye, St. Joseph, MI (US)

(72) Inventor: John R. Nye, St. Joseph, MI (US)

( * ) Notice: Subject to any disclaimer, the term of this patent is extended or adjusted under 35 U.S.C. 154(b) by 13 days.

(21) Appl. No.: 14/192,232

(22) Filed: Feb. 27, 2014

(65) Prior Publication Data

US 2014/0239080 A1    Aug. 28, 2014

Related U.S. Application Data

(60) Provisional application No. 61/770,551, filed on Feb. 28, 2013.

(51) Int. Cl.
*A01G 25/02* (2006.01)
*A01G 9/24* (2006.01)

(52) U.S. Cl.
CPC ............... *A01G 25/02* (2013.01); *A01G 9/247* (2013.01)

(58) Field of Classification Search
CPC ........ A01G 25/00; A01G 25/02; A01G 9/24; A01G 9/247
USPC .......................................................... 239/208
See application file for complete search history.

(56) References Cited

U.S. PATENT DOCUMENTS 3,630,448 A    12/1971    Chapin
6,523,616 B1 *  2/2003    Wallace ........................ 169/70

FOREIGN PATENT DOCUMENTS

| DE | 380896 | 9/1923 |
|---|---|---|
| FR | 1131614 A | 2/1957 |
| GB | 1213108 A | 11/1970 |
| WO | 9524970 A1 | 9/1995 |
| WO | 2005118153 A1 | 12/2005 |

OTHER PUBLICATIONS

Sparks, Brian, Better Coverage, Better Control: The Solid Set Canopy Delivery System Has the Potential to Revolutionize Pest Control in Tree Fruit Orchards, American Fruit Grower, Feb. 2013, 5 pages.
Jain Irrigation Inc., Compression Fittings, 2010, 8 pages.
European Patent Office, Communication Relating to the Results of the Partial International Search, Jun. 4, 2014.
European Patent Office, International Search Report, Sep. 3, 2014.
European Patent Office, Written Opinion, Sep. 3, 2014.
European Patent Office, International Preliminary Report on Patentability and Written Opinion in corresponding PCT Application, 12 pages, Sep. 1, 2015.
Agnello, Arthur, Andrew Landers, Bruce Wadhams and Walid Shayya, Current Progress in Developing a Fixed-Spray Application System for High-Density Apple Plantings, Jan. 1, 2006, 22 pages.

* cited by examiner

*Primary Examiner* — Christopher Kim
(74) *Attorney, Agent, or Firm* — Barnes & Thornburg LLP

(57) ABSTRACT

A fixed spray application system generally includes tubing, one or more spray heads, one or more brackets, one or more connectors and one or more fluid reservoirs. One or more of the spray heads may be suspended from a tube below one of the connectors and below one of the reservoirs. A tube may extend from below one of the reservoirs to another spray head supported by one of the brackets. In use, the system may be suspended from trellis wires in an agricultural field. Water, pesticides or other liquids are supplied to the system through the tubing. The size of the reservoirs and the volume of tubing can be selected to hold the desired amount of liquid for a given application. After the system is primed with liquid, the tubing is connected to a source of pressurized air. The air is supplied to the system at a sufficient pressure so as to force the liquid from the system through the spray heads.

16 Claims, 7 Drawing Sheets

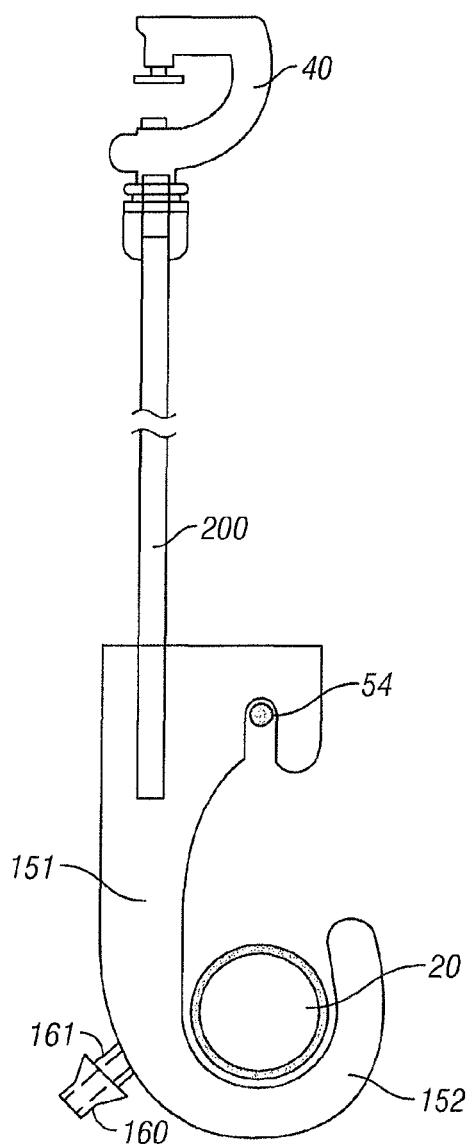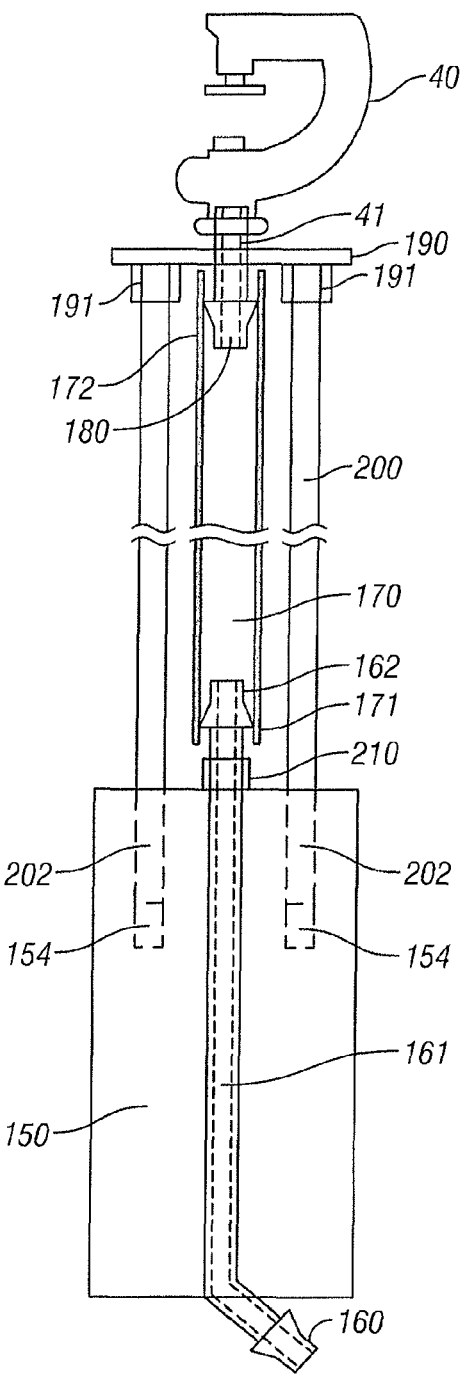
FIG. 5
FIG. 6

FIXED SPRAY APPLICATION SYSTEM

The present invention relates to a system for applying liquids to a selected area, and in particular, to a fixed spray application system for such purposes.

BACKGROUND AND SUMMARY OF THE INVENTION

Various systems are known for applying liquids to a selected area. For example, various systems are used to apply water, pesticides and other liquids to crops, orchards and fields.

In one embodiment of the present invention, a system for applying liquids over a selected area includes a first tube for transporting liquid through the system, at least one connector secured to the first tube, a liquid reservoir having a first end connected to the connector and a second end, a check valve having an inlet side connected to the second end of the liquid reservoir and an outlet side, a second tube extending from the outlet side of the check valve to a first spray head and a third tube extending from the second tube at a location between the outlet side of the check valve and the first spray head to a second spray head.

In certain embodiments of the invention, the fluid reservoir extends downwardly from the connector. The second tube may support the first spray head below the reservoir.

In other embodiments, the first spray head is positioned below the first tube and the second spray head is positioned above the first tube.

In some embodiments, the system further includes a bracket for supporting the first tube and the second spray head. The bracket may include a first channel and the third tube can extend at least partially through the first channel. In other embodiments, the bracket may include a second channel and the system may further include a third spray head and a fourth tube extending through the second channel and connected to the third spray head. The bracket can include a slot for suspending the bracket from a wire. In some embodiments, the second spray head is located adjacent the bracket. In other embodiments, the system further includes at least one extension member for supporting the second spray head at a location spaced from the bracket.

In some embodiments of the invention, the connector includes at least one member for suspending the system from a wire. In other embodiments, the connector further includes a channel and the third tube extends at least partially into the channel and connects to the second spray head. In some embodiments, the connector supports the second spray head. The spray head may be located adjacent the connector. In other embodiments, the system further includes at least one extension member for supporting the second spray head at a location spaced from the connector.

In another embodiment of the present invention, a system for applying liquids over a selected area includes a source of liquid, a first tube for transporting liquid from the source through the system, at least one connector secured to the first tube, the connector having a first open end for receiving liquid from the source, a second open end aligned with the first open end and an outlet disposed at an angle relative to the first and second open ends, a liquid reservoir having a first end connected to the outlet and a second end and a first spray head in fluid communication with the second end of the liquid reservoir.

In some embodiments, the system further includes a check valve located between the liquid reservoir and the spray head. The system may also include a second spray head located above the first spray head. In other embodiments, the system further includes a channel in the connector and a second tube extending from a location between the second end of the liquid reservoir and the first spray head through the channel to the second spray head. The system may also include a bracket supporting the first tube and the second spray head. The bracket may include a slot for supporting the bracket from a wire.

In one embodiment of the present invention, a method of applying liquids over a selected area includes providing a source of liquid, a first tube for transporting liquid from the source through the system, a connector secured to the first tube, a liquid reservoir having a first end connected to the connector and a second end, a check valve having an inlet side connected to the second end of the liquid reservoir and an outlet side and a first spray head in fluid communication with the fluid reservoir. The check valve is operable to permit the passage of liquid from the inlet side to the outlet side upon pressurization of the liquid above a threshold pressurization level. The method further includes introducing an amount of liquid to be applied to the selected area from the source, through the first tube and to the liquid reservoir and providing pressurized air through the first tube to pressurize the liquid in the liquid reservoir above the threshold pressurization level of the check valve, thereby transporting liquid from the liquid reservoir, through the check valve and through the first spray head.

BRIEF DESCRIPTION OF THE DRAWINGS

FIG. 5 is first side view of a support bracket and spray head that are components of the system shown in FIG. 1.

FIG. 6 is another view of the components illustrated in FIG. 5.

DETAILED DESCRIPTION OF THE EMBODIMENTS OF THE INVENTION

Figure 1:
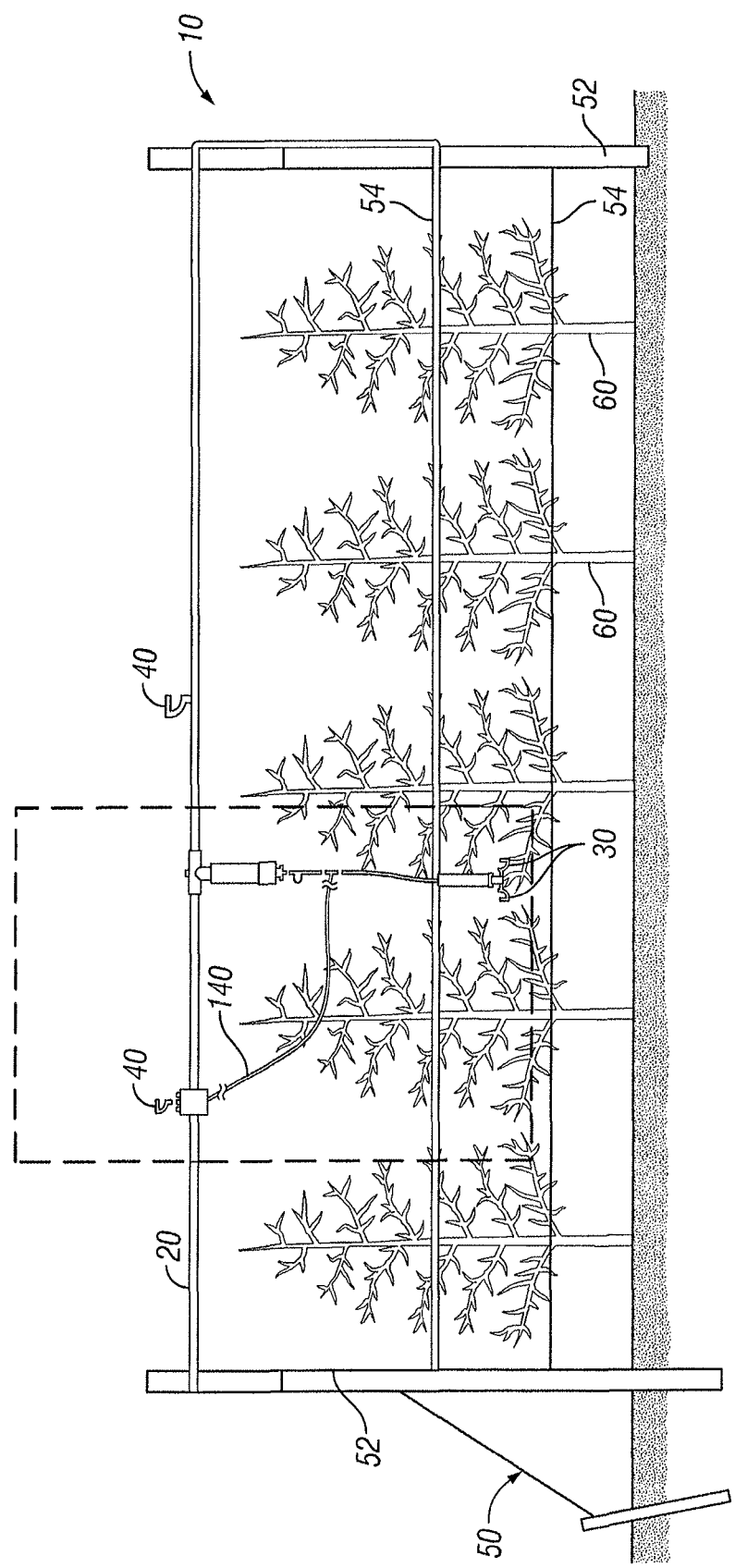
FIG. 1 illustrates a fixed spray application system according to one embodiment of the present invention.

FIG. 1 illustrates a fixed spray application system 10 according to one embodiment of the present invention. System 10 generally includes tubing, such as polyethylene tubing, 20, a first plurality of spray heads 30 and a second plurality of spray heads 40. In FIG. 1 system 10 is shown used in connection with a standard trellis system 50 that generally includes supports 52, having a plurality of trellis wires 54, the upper most of which are not visible in FIG. 1.

Trellis wires 54 extend between supports 52 and provide a trellis system for trees 60 in the manner conventional in the art.

Figure 2:
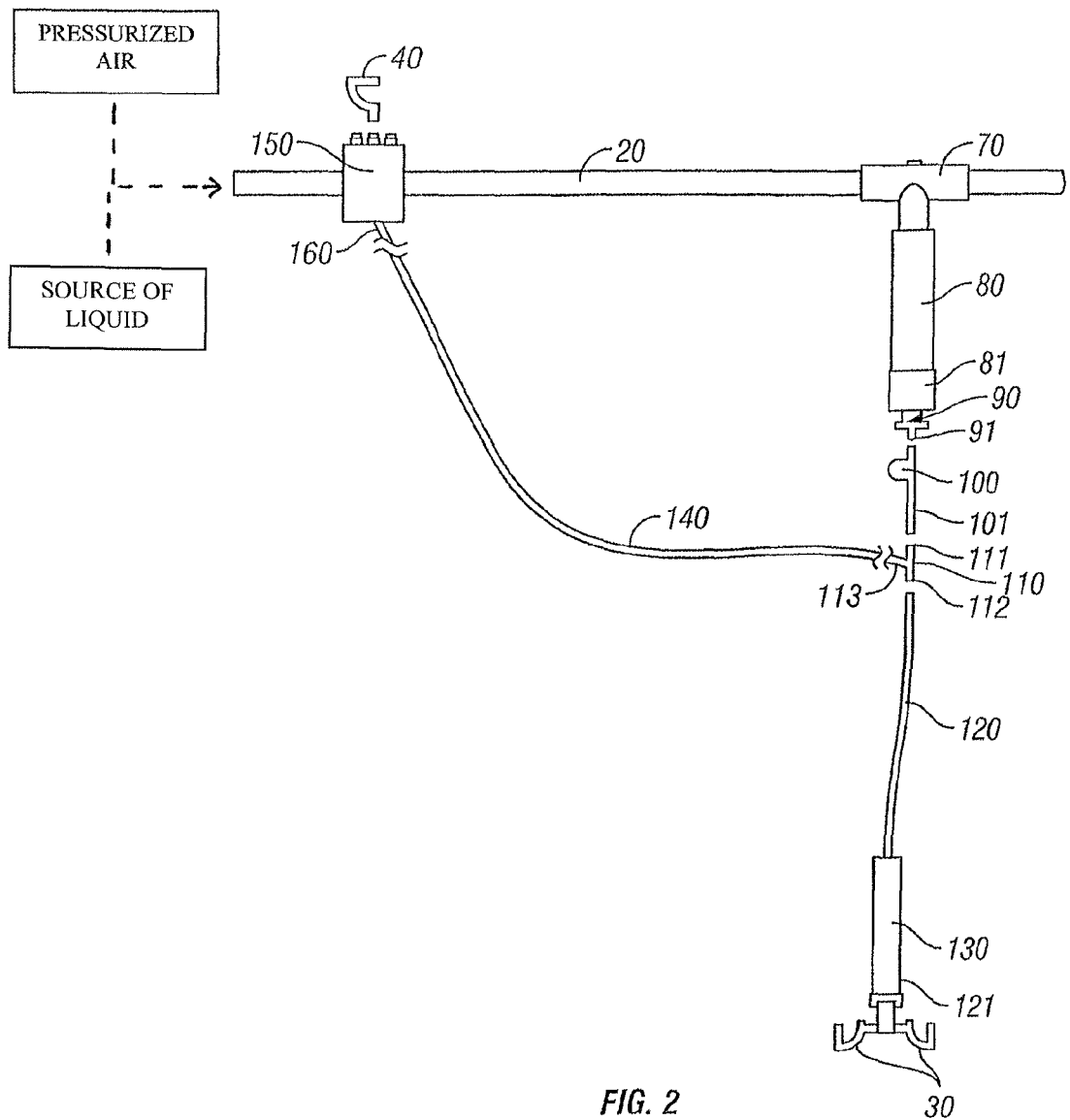
FIG. 2 illustrates the components in area 2 in FIG. 1.
Figure 3:
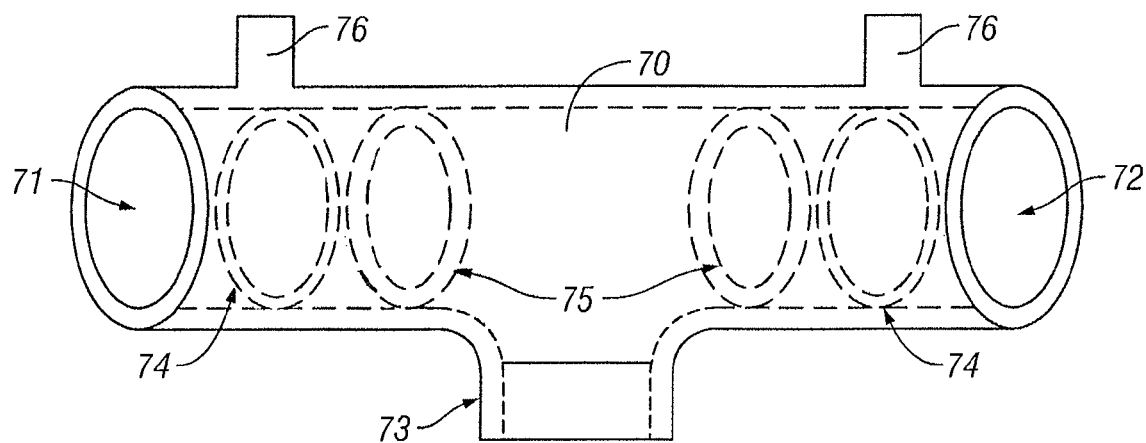
FIG. 3 is a side plan view of a connector that is a component of the system shown in FIG. 1.
Figure 4:
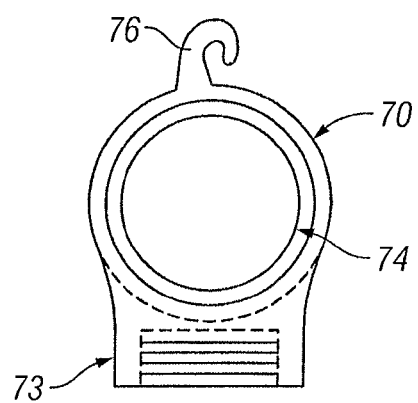
FIG. 4 is an end view of the connector shown in FIG. 3.

FIG. 2 shows the components in area 2 of FIG. 1 in greater detail. As shown in FIGS. 2, 3 and 4, a plurality of generally T-shaped connectors 70 are spaced along tubing 20 and are associated with the first plurality of spray heads 30. As illustrated in FIG. 3, each T-shaped connector 70 includes a first end 71, a second end 72, and an outlet 73. One or more barbed compression rings or other fasteners 74 may be formed on the interior of connector 70 to engage tubing 20 and secure it in place. Connector 70 may further include internally molded or otherwise formed stop members 75 to limit the distance into connectors 70 that tubing 20 can extend. In particular, it is desirable that the ends of tubing 20 not extend so far into ends 71 and 72 so as to obstruct outlet 73. A plurality of suspension or connection members 76 are formed integrally with connectors 70. In the embodiment shown, members 76 are substantially in the form of a hook and are used to suspend connectors 70 from trellis wires 54.

Outlet 73 in the embodiment shown is internally threaded for connecting a reservoir 80 outlet 73. Other connection means may also be utilized. Reservoir 80 extends from outlet 73 and terminates in an open end 81. End 81 may be threaded or provided with other connection means for securing a cap 90 thereto. Cap 90 has a connector or connecting portion 91 extending therefrom that is designed to secure a leak prevention device 100 to cap 90. Leak prevention device 100 is of a conventional type known in the art and typically includes a check valve that prevents liquid from flowing through leak prevention device 100 until sufficient pressure is supplied to open the check valve. A second generally T-shaped connector 110 is secured at first end 111 to tubing 101 extending from leak prevention device 100 and connected at a second end 112 to tubing 120. Tubing 120 is connected at a lower end 121 to spray heads 30. In the embodiment shown a weight 130 is positioned around or otherwise connected to tubing 120 near end 121 to prevent undesired blowing or movement of spray heads 30. A tube 140 extends from a third end 113 of connector 110 and extends upwardly toward spray heads 40 for supplying fluid thereto, as described in greater detail below.

As show in FIGS. 5 and 6, brackets 150 include a body portion 151, a first generally J-shaped portion at 152 and a depression or slot 153 for suspending brackets 150 from trellis wires 54. Portion 152 supports tubing 20. A connector 160 is attached to first end of tubing 161 that extends through body portion 151 of bracket 150. Connector 160 engages tube 140. A second connector 162 is secured to the opposite end of tube 161 and is secured to tube 170 at first end 171. A connector 180 is secured to the inlet 41 of spray heads 40 and engages second and 172 of tube 170. In the embodiment shown, connector 180 is located below a plate 190 that is a portion of a riser mechanism for spray heads 40. In particular, plate 190 includes downwardly extending bosses or connectors 191 that receive rigid extension posts 200 at a first end 201 thereof. The opposite ends 202 of post 200 extend into recesses 154 of brackets 150. Different length posts 200 can be used to adjust the height of spray heads 40. Alternatively, posts 200 can be eliminated and spray heads 40 can be connected directly to tube 161 adjacent the top of bracket 150 by a connecting post 210.

Figure 7:
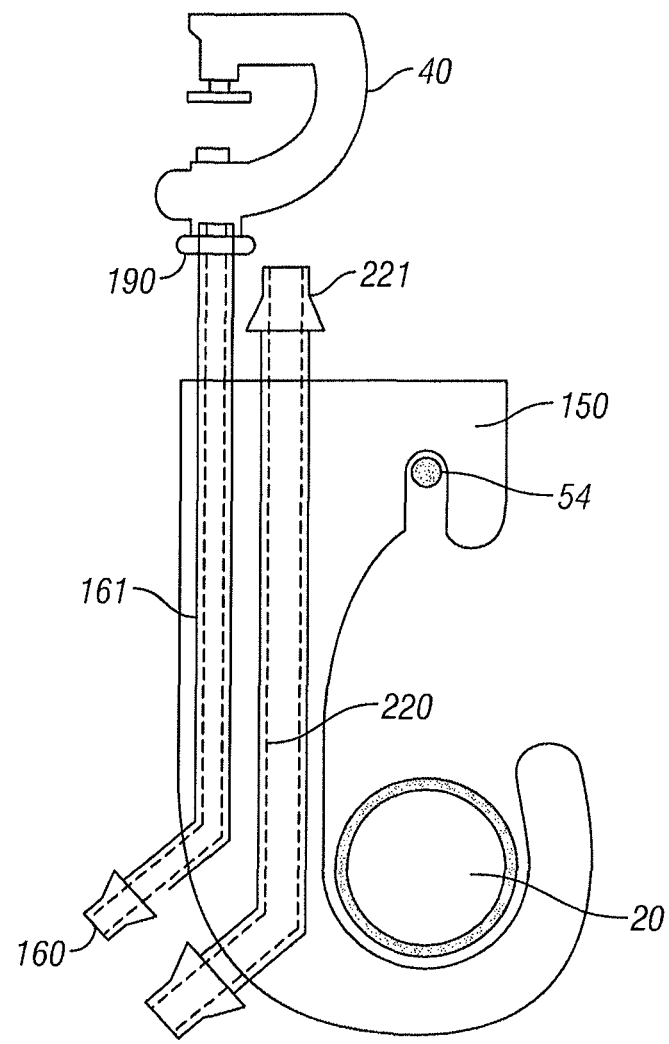
FIG. 7 is a first side view of an alternative embodiment of a support bracket and spray head that are components of the system according to one embodiment of the invention.

FIG. 7 shows an alternative embodiment of bracket 150. In this embodiment, spray heads 40 are connected to the riser mechanism as described above. A second tubing flow path 220 is formed in bracket 150 and terminates in connector 221 adjacent the top of bracket 150. With this embodiment, spray heads 40 may simply be disconnected from the riser mechanism and connected to connector 221 to lower its position without removing the riser mechanism.

Figure 8:
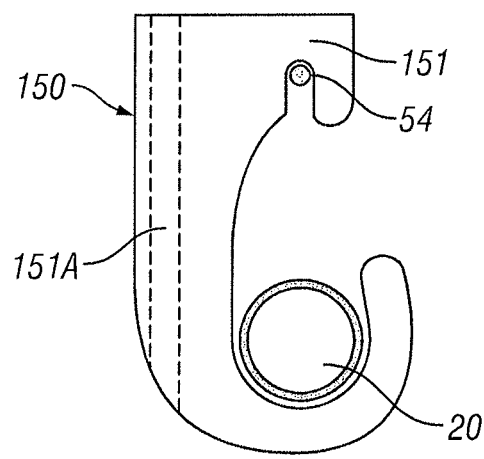
FIG. 8 is a first side view of an alternative embodiment of a support bracket that is a component of the system according to one embodiment of the invention.
Figure 9:
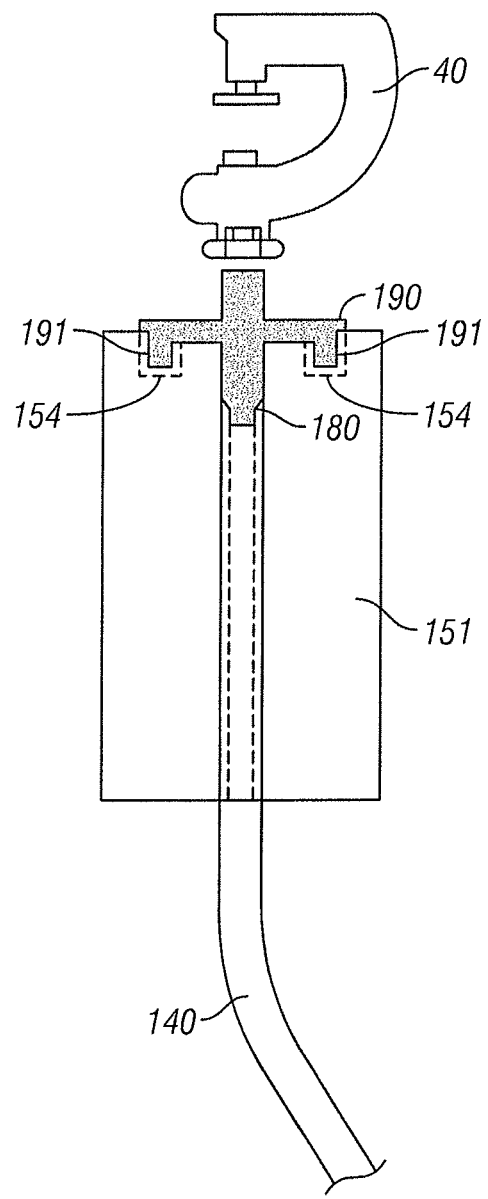
FIG. 9 is another view of the support bracket of FIG. 8 with a spay head installed thereon.

FIGS. 8 and 9 show an alternative embodiment of the bracket and spray head components of FIGS. 5 and 6. In this embodiment, extension posts 200 have been eliminated and downwardly extending bosses or connectors 191 of plate 190 extend into recesses 154 of brackets 150. Tube 140 extends through a channel 151A in body portion 151 and connects to connector 180 secured to the inlet 41 of spray head 40.

Figure 10:
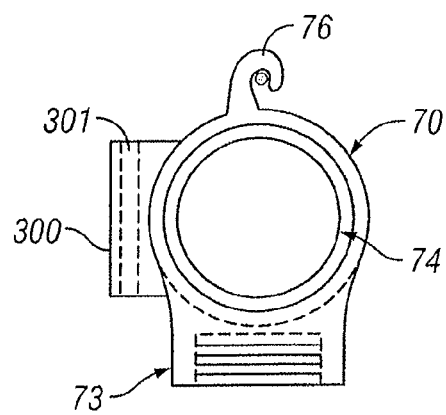
FIG. 10 is an end view of an alternative embodiment of a connector that is a component of one embodiment of the present invention.
Figure 11:
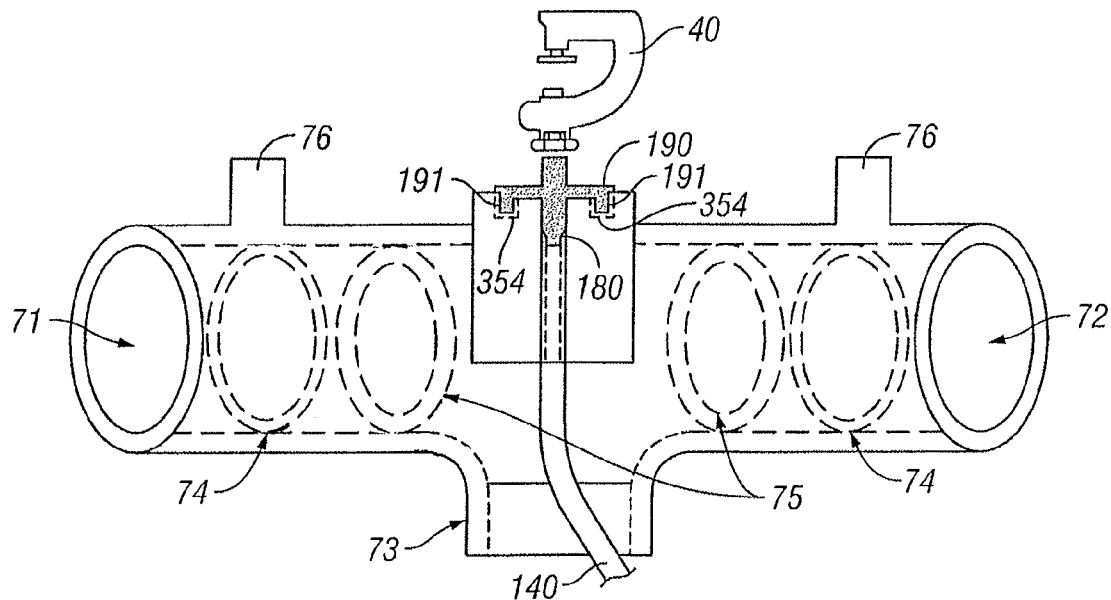
FIG. 11 is a side view of the connector shown in FIG. 10 with a spray head installed thereon.

FIGS. 10 and 11 illustrate an alternative embodiment of connectors 70. In this embodiment, connector 70 includes a section 300 having a channel 301 extending therethrough. In a manner similar to brackets 150, section 300 includes recesses 354 for receiving downwardly extending bosses or connectors 191 of plates 190. Tube 140 extends through channel 301 in section 300 and connects to connector 180 secured to the inlet 41 of spray head 40.

In use, system 10 is assembled as described above and suspended from trellis wires 54. In one embodiment of the invention, spray heads 30 are positioned approximately 6 feet apart and extend into the tree canopy or other items to be sprayed. Spray head 40 are also placed approximately 6 feet apart and spaced equally between connectors 70. Water, pesticides or other liquids can be supplied to the system through tubing 20 in a conventional manner, such as by pumping. The liquid is supplied at a pressure below that which will open the check valve in leak prevention device 100 until the tubing 20 and reservoirs 80 are filled with the desired amount of liquid. The size of reservoirs 80 and the volume of tubing 20 in the system can be selected so as to hold the desired amount of liquid for a given application. The pumping or other supply system is then disconnected and tubing 20 is connected to a source of pressurized air, such as a compressor. Pressurized air is applied to the system at a sufficient pressure so as to cause the check valve in leak prevention device 100 to open, thereby forcing the liquid throughout the system including in tubing 20 and reservoirs 80 through tubing 120 and 140, and ultimately out spray heads 30 and 40. Pressure should be applied for a period of time sufficient to evacuate the desired amount of liquid, such as all liquid, from the system.

Note that by priming the system with liquid but dispensing the liquid with air, a much smaller amount of liquid can be utilized per application. For example, if it is desirable to apply 100 gallons of liquid to the trees or crops, approximately 100 gallons is pumped into the system and then blown out with compressed air. Alternatively, to ensure full delivery of the desired amount of liquid, the system can be primed with a slight excess amount of liquid, such as 130 gallons. The excess is then blown through and outlet port or valve in the system at a pressure below that required to open the check valve. After the excess liquid is removed, the air pressure is increased sufficiently to open the check valve and the liquid is delivered through the spray heads as described above. In either event, to apply the same 100 gallons of liquid by continually pumping liquid through the system would require pumping approximately 400 gallons of liquid into the system. The compressed air can also be forced through the system more quickly than liquid thereby decreasing application times.

Although the system has been shown and described in detail, the same is to be taken by way of example only and not by way of limitation. Numerous changes can be made to the components described above, the materials from which they are manufactured and their placement in the system while achieving the same effects. For example, any combination of the various embodiments of connectors 70 and brackets 150 may be used to achieve the desired placement of spray heads 30 and 40.

What is claimed is:

1. A system for applying liquids over a selected area including:
   a first tube for transporting liquid through the system;
   at least one connector secured to the first tube;
   a liquid reservoir having a first end connected to the connector and a second end;
   a check valve having an inlet side connected to the second end of the liquid reservoir and an outlet side;
   a second tube extending from the outlet side of the check valve to a first spray head;
   a third tube extending from the second tube at a location between the outlet side of the check valve and the first spray head to a second spray head; and
   a bracket supporting the first tube and the second spray head.

2. The system of claim 1, wherein the bracket includes a first channel and the third tube extends at least partially through the first channel.

3. The system of claim 2, further including a second channel in the bracket, a third spray head and a fourth tube extending through the second channel and connected to the third spray head.

4. The system of claim 1, further including a slot in the bracket for suspending the bracket from a wire.

5. The system of claim 1, wherein the second spray head is located adjacent the bracket.

6. The system of claim 1, further including at least one extension member for supporting the second spray head at a location spaced from the bracket.

7. A system for applying liquids over a selected area including:
   a source of liquid;
   a first tube for transporting liquid from the source through the system;
   at least one connector secured to the first tube, the connector having a first open end for receiving liquid from the source, a second open end aligned with the first open end and an outlet disposed at an angle relative to the first and second open ends;
   a liquid reservoir having a first end connected to the outlet and a second end;
   a first spray head in fluid communication with the second end of the liquid reservoir;
   a second spray head located above the first spray head;
   a channel in the connector; and
   a second tube extending from a location between the second end of the liquid reservoir and the first spray head through the channel to the second spray head.

8. The system of claim 7, further including a check valve located between the liquid reservoir and the spray head.

9. The system of claim 7, further including a bracket supporting the first tube and the second spray head.

10. The system of claim 9, wherein the bracket includes a slot for supporting the bracket from a wire.

11. A system for applying liquids over a selected area including:
    a first tube for transporting liquid through the system;
    at least one connector secured to the first tube;
    a liquid reservoir extending downwardly from the connector and having a first end connected to the connector and a second end;
    a check valve having an inlet side connected to the second end of the liquid reservoir and an outlet side;
    a second tube extending from the outlet side of the check valve to a first spray head; and
    a third tube extending from the second tube at a location between the outlet side of the check valve and the first spray head to a second spray head.

12. A system for applying liquids over a selected area including:
    a first tube for transporting liquid through the system;
    at least one connector secured to the first tube;
    a liquid reservoir having a first end connected to the connector and a second end;
    a check valve having an inlet side connected to the second end of the liquid reservoir and an outlet side;
    a second tube extending from the outlet side of the check valve to a first spray head and supporting the first spray head below the reservoir; and
    a third tube extending from the second tube at a location between the outlet side of the check valve and the first spray head to a second spray head.

13. A system for applying liquids over a selected area including:
    a first tube for transporting liquid through the system;
    at least one connector secured to the first tube;
    a liquid reservoir having a first end connected to the connector and a second end;
    a check valve having an inlet side connected to the second end of the liquid reservoir and an outlet side;
    a second tube extending from the outlet side of the check valve to a first spray head positioned below the first tube; and
    a third tube extending from the second tube at a location between the outlet side of the check valve and the first spray head to a second spray head positioned above the first tube.

14. A system for applying liquids over a selected area including:
    a first tube for transporting liquid through the system;
    at least one connector secured to the first tube, the connector including at least one member for suspending the system from a wire;
    a liquid reservoir having a first end connected to the connector and a second end;
    a check valve having an inlet side connected to the second end of the liquid reservoir and an outlet side;
    a second tube extending from the outlet side of the check valve to a first spray head; and
    a third tube extending from the second tube at a location between the outlet side of the check valve and the first spray head to a second spray head.

15. A system for applying liquids over a selected area including:
    a first tube for transporting liquid through the system;
    at least one connector including a channel secured to the first tube;
    a liquid reservoir having a first end connected to the connector and a second end;
    a check valve having an inlet side connected to the second end of the liquid reservoir and an outlet side;
    a second tube extending from the outlet side of the check valve to a first spray head; and
    a third tube extending from the second tube at a location between the outlet side of the check valve and the first spray head, the third tube extending at least partially into the channel and connecting to a second spray head.

16. A system for applying liquids over a selected area including:
- a first tube for transporting liquid through the system;
- at least one connector secured to the first tube;
- a liquid reservoir having a first end connected to the connector and a second end;
- a check valve having an inlet side connected to the second end of the liquid reservoir and an outlet side;
- a second tube extending from the outlet side of the check valve to a first spray head;
- a third tube extending from the second tube at a location between the outlet side of the check valve and the first spray head to a second spray head; and
- wherein the connector supports the second spray head, the system further including at least one extension member for supporting the second spray head at a location spaced from the connector.

* * * * *